(12) United States Patent
Zave

(10) Patent No.: US 8,126,017 B1
(45) Date of Patent: Feb. 28, 2012

(54) METHOD FOR ADDRESS TRANSLATION IN TELECOMMUNICATION FEATURES

(75) Inventor: Pamela Zave, Chatham, NJ (US)

(73) Assignee: AT&T Intellectual Property II, L.P., Atlanta, GA (US)

(*) Notice: Subject to any disclaimer, the term of this patent is extended or adjusted under 35 U.S.C. 154(b) by 1403 days.

(21) Appl. No.: 11/128,885

(22) Filed: May 13, 2005

Related U.S. Application Data

(60) Provisional application No. 60/573,722, filed on May 21, 2004.

(51) Int. Cl.
*H04J 3/26* (2006.01)
(52) U.S. Cl. ................................ 370/475; 379/220.01
(58) Field of Classification Search .................. 370/392, 370/401
See application file for complete search history.

(56) References Cited

U.S. PATENT DOCUMENTS

| | | | |
|---|---|---|---|
| 4,488,004 A | 12/1984 | Bogart et al. | |
| 5,386,464 A * | 1/1995 | Pruitt | 379/201.03 |
| 5,442,689 A * | 8/1995 | Buttitta et al. | 379/229 |
| 5,467,388 A | 11/1995 | Redd, Jr. et al. | |
| 5,481,602 A | 1/1996 | Griffiths et al. | |
| 5,495,285 A * | 2/1996 | Fujioka | 348/14.08 |
| 5,530,931 A * | 6/1996 | Cook-Hellberg et al. | 379/211.03 |
| 5,548,636 A * | 8/1996 | Bannister et al. | 379/390.01 |
| 5,553,128 A * | 9/1996 | Grimes | 379/211.02 |
| 5,583,929 A | 12/1996 | Ardon | |
| 5,590,184 A * | 12/1996 | London | 379/142.09 |
| 5,592,541 A * | 1/1997 | Fleischer et al. | 379/211.02 |
| 5,623,536 A | 4/1997 | Solomon et al. | |
| 5,654,961 A | 8/1997 | Aranjo et al. | |
| 5,706,286 A * | 1/1998 | Reiman et al. | 370/401 |
| 5,708,702 A * | 1/1998 | De Paul et al. | 379/221.1 |
| 5,737,403 A * | 4/1998 | Zave | 379/211.02 |
| 5,768,358 A * | 6/1998 | Venier et al. | 379/221.14 |
| 5,793,859 A * | 8/1998 | Matthews | 379/211.03 |
| 5,838,782 A * | 11/1998 | Lindquist | 379/221.1 |
| 5,852,660 A * | 12/1998 | Lindquist et al. | 379/230 |
| 5,901,209 A * | 5/1999 | Tannenbaum et al. | 379/142.09 |
| 5,926,464 A * | 7/1999 | Fraser | 370/259 |
| 5,940,394 A * | 8/1999 | Killian | 370/393 |
| 5,940,490 A * | 8/1999 | Foster et al. | 379/211.02 |
| 6,064,653 A * | 5/2000 | Farris | 370/237 |
| 6,157,636 A * | 12/2000 | Voit et al. | 370/353 |

(Continued)

OTHER PUBLICATIONS

Zave, Pamela, Ideal address translation: Principles, properties, and applications, Feature Interactions in Telecommunications and Software Systems VII, pp. 257-274, IOS Press, Jun. 11, 2003.

(Continued)

*Primary Examiner* — Ricky Ngo
*Assistant Examiner* — Ben Liu

(57) ABSTRACT

A method for address translation in telecommunication networks that reduces the feature-interaction problems is disclosed. In one embodiment, a module in a target region of a request chain is constrained in a way such that that module cannot change a source address in a call request. In a second embodiment, a source feature module in a source region can only replace a source address with a more abstract address than the one it is replacing. In another embodiment, a target feature module in a target region can only replace a target address with a more concrete address than the one it is replacing. In yet another embodiment, a source feature module cannot transmit downstream an alternative source address more concrete than its own address. And in a final embodiment, a target feature module cannot transmit upstream an alternative target address that is more concrete than its own address.

17 Claims, 9 Drawing Sheets

U.S. PATENT DOCUMENTS

| | | | |
|---|---|---|---|
| 6,160,883 A * | 12/2000 | Jackson et al. | 379/230 |
| 6,175,564 B1 * | 1/2001 | Miloslavsky et al. | 370/352 |
| 6,175,620 B1 * | 1/2001 | Rouge et al. | 379/207.01 |
| 6,178,167 B1 * | 1/2001 | Fraser | 370/359 |
| 6,201,804 B1 * | 3/2001 | Kikinis | 370/352 |
| 6,222,859 B1 * | 4/2001 | Yoshikawa | 370/522 |
| 6,226,289 B1 * | 5/2001 | Williams et al. | 370/385 |
| 6,236,722 B1 * | 5/2001 | Gilbert et al. | 379/230 |
| 6,298,062 B1 * | 10/2001 | Gardell et al. | 370/401 |
| 6,301,350 B1 * | 10/2001 | Henningson et al. | 379/220.01 |
| 6,324,279 B1 * | 11/2001 | Kalmanek et al. | 379/229 |
| 6,327,358 B1 * | 12/2001 | March et al. | 379/221.01 |
| 6,377,674 B1 * | 4/2002 | Chong et al. | 379/230 |
| 6,404,878 B1 * | 6/2002 | Jackson et al. | 379/221.01 |
| 6,459,788 B1 * | 10/2002 | Khuc et al. | 379/265.09 |
| 6,470,008 B1 * | 10/2002 | Khuc | 370/352 |
| 6,473,426 B1 * | 10/2002 | Killian | 370/393 |
| 6,473,505 B1 * | 10/2002 | Khuc et al. | 379/265.01 |
| 6,490,347 B2 * | 12/2002 | DeCaluwe et al. | 379/211.01 |
| 6,510,154 B1 * | 1/2003 | Mayes et al. | 370/389 |
| 6,522,655 B1 * | 2/2003 | Laiho | 370/410 |
| 6,574,323 B1 * | 6/2003 | Manuel et al. | 379/207.02 |
| 6,690,932 B1 * | 2/2004 | Barnier et al. | 455/414.1 |
| 6,717,949 B1 * | 4/2004 | Boden et al. | 370/401 |
| 6,721,395 B2 * | 4/2004 | Martinez | 379/45 |
| 6,731,642 B1 * | 5/2004 | Borella et al. | 370/401 |
| 6,760,780 B1 * | 7/2004 | Chitturi et al. | 709/248 |
| 6,778,560 B1 * | 8/2004 | Zave et al. | 370/522 |
| 6,822,942 B1 * | 11/2004 | Jackson et al. | 370/254 |
| 6,826,275 B1 * | 11/2004 | Jackson et al. | 379/230 |
| 6,829,346 B1 | 12/2004 | Zave et al. | |
| 6,831,974 B1 * | 12/2004 | Watson et al. | 379/265.02 |
| 6,839,414 B1 * | 1/2005 | Enzmann et al. | 379/142.06 |
| 6,871,070 B2 * | 3/2005 | Ejzak | 455/435.1 |
| 6,925,076 B1 * | 8/2005 | Dalgic et al. | 370/356 |
| 6,928,070 B2 * | 8/2005 | Emerson, III | 370/352 |
| 6,940,866 B1 * | 9/2005 | Miller et al. | 370/426 |
| 6,980,821 B2 * | 12/2005 | Balasuriya et al. | 455/518 |
| 6,990,185 B1 * | 1/2006 | Zave et al. | 379/201.04 |
| 7,020,707 B2 * | 3/2006 | Sternagle | 709/230 |
| 7,068,655 B2 * | 6/2006 | March et al. | 370/392 |
| 7,072,332 B2 * | 7/2006 | D'Souza | 370/352 |
| 7,075,931 B2 * | 7/2006 | Li et al. | 370/392 |
| 7,099,454 B1 * | 8/2006 | Cope et al. | 379/245 |
| 7,103,032 B2 * | 9/2006 | Kobayashi | 370/352 |
| 7,126,954 B2 * | 10/2006 | Fang et al. | 370/401 |
| 7,158,507 B1 * | 1/2007 | Olkkonen et al. | 370/352 |
| 7,173,928 B2 * | 2/2007 | Xu et al. | 370/352 |
| 7,233,995 B2 * | 6/2007 | Yamaguchi et al. | 709/227 |
| 7,242,680 B2 * | 7/2007 | Gallant | 370/352 |
| 7,266,187 B2 * | 9/2007 | Horne | 379/142.06 |
| 7,277,421 B1 * | 10/2007 | Pershan | 370/352 |
| 7,280,532 B2 * | 10/2007 | Um | 370/352 |
| 7,295,667 B1 * | 11/2007 | Jackson et al. | 379/230 |
| 7,333,500 B2 * | 2/2008 | Roshko | 370/401 |
| 7,342,926 B2 * | 3/2008 | Uskela et al. | 370/392 |
| 7,349,382 B2 * | 3/2008 | Marimuthu et al. | 370/351 |
| 7,363,381 B2 * | 4/2008 | Mussman et al. | 709/230 |
| 7,385,975 B2 * | 6/2008 | Liu | 370/389 |
| 7,412,051 B1 * | 8/2008 | Beathard et al. | 379/219 |
| 7,436,804 B2 * | 10/2008 | O'Neill | 370/331 |
| 7,469,046 B1 * | 12/2008 | Jackson et al. | 379/230 |
| 7,573,873 B1 * | 8/2009 | Borella et al. | 370/389 |
| 7,643,412 B1 * | 1/2010 | Mitchell et al. | 370/230 |
| 7,813,274 B1 * | 10/2010 | Venable, Sr. | 370/230 |
| 2001/0040887 A1 * | 11/2001 | Shtivelman et al. | 370/352 |
| 2001/0049745 A1 * | 12/2001 | Schoeffler | 709/238 |
| 2002/0150091 A1 * | 10/2002 | Lopponen et al. | 370/389 |
| 2003/0095541 A1 * | 5/2003 | Chang et al. | 370/352 |
| 2004/0264663 A1 * | 12/2004 | Enzmann et al. | 379/142.06 |

OTHER PUBLICATIONS

Zave, Pamela, From Architecture to Requirements: A Success Story, Conference Paper, Second International Workshop from SofTware Requirements to Architectures (STRAW '03), May 11, 2003.

Zave, Pamela, From Architecture to Requirements: A Telecommunication's Success Story, Presentation Slides, Second International Workshop from SofTware Requirements to Architectures—(STRAW '03), May 23, 2003.

Zave, Pamela, From Architecture to Requirements: A Success Story, Proceedings of the International Conference on Software Engineering, International Software Requirements Architecture Workshop 2003 (STRAW '03), Portland, Oregon, May 3-11, 2003.

U.S. Appl. No. 09/644,128, filed Aug. 23, 2000.

* cited by examiner

US 8,126,017 B1

METHOD FOR ADDRESS TRANSLATION IN TELECOMMUNICATION FEATURES

This application claims the benefit of U.S. Provisional Application No. 60/573,722, filed May 21, 2004, which is incorporated herein by reference.

BACKGROUND OF THE INVENTION

This invention relates to telecommunications networks, and more particularly to providing telecommunication features and services in such networks.

As new features such as call forwarding, call waiting, or three-way calling have been added to telecommunication systems, it has become increasingly difficult to manage the behavioral complexity of the features and their interactions. In particular, in some instances, the widely varied features offered by today's telecommunication providers conflict and produce unintended results. This is frequently referred to as the feature-interaction problem. This problem arises primarily from the incremental, feature-by-feature extension of telecommunications system functionality. Specifically, when adding new features, a comprehensive analysis of potential interactions with other features, followed by a redesign of old features to integrate smoothly with the new features, is typically not practical. Thus, as more and more new features are added to these systems, the resulting complexity of system operations in providing features, and the interaction of various features with each other, can potentially damage the quality of the telecommunication network services.

Prior attempts have been made to reduce the problems resulting from such feature interactions. For example, U.S. Pat. No. 6,160,883, issued Nov. 23, 2004 and entitled "Telecommunication System and Method," which is incorporated by reference herein, discloses a network architecture, referred to as a distributed feature composition (DFC) network, for managing the feature-interaction problem. Additionally, pending utility applications, "Routing Extensions For Telecommunications Network System And Method," Ser. No. 09/644,128, filed Aug. 23, 2000; U.S. Pat. No. 6,822,942, issued Nov. 23, 2004 and entitled "Protocol Extensions For Telecommunications Network Systems and Method;" and, U.S. Pat. No. 6,778,560, issued Aug. 17, 2004 and entitled "Signaling/Media Separation for Telecommunication Network System and Method," which are incorporated by reference herein, disclosed an enhanced and modified DFC to further address feature interaction problems.

As is well known, requests for telecommunication features in DFC and other telecommunication systems, for example originating from a telephone in a PSTN network, typically comprise messages having at least two addresses, a source address and a target address. The source address typically corresponds with the originator of the request, while the target address corresponds with the destination party of the request. As is also well known, as a call is transmitted from the originator to the destination and features are applied to the call, address translation is commonly required by many of the features. Such address translation typically consists of, for example, modifying the communication by changing the source address, target address or both addresses for various purposes. Due to its widespread use, address translation results in a high number of feature interactions in today's telecommunication networks. Accordingly, many of the feature-interaction problems that occur in telecommunication networks may be traced directly to issues created as a result of such address translation.

SUMMARY OF THE INVENTION

The present invention is a method for address translation in telecommunication networks that reduces the feature-interaction problems that occur as a result of address translation activities. Specifically, in one illustrative embodiment, a module in a target region of a request chain is constrained in a way such that that module cannot change a source address in a call request. This constraint functions to preserve reversibility of the request chain in, for example, replies to the original request. In a second illustrative embodiment, a source feature module in a source region can only replace a source address with a more abstract address than the one it is replacing. In another embodiment, a target feature module in a target region can only replace a target address with a more concrete address than the one it is replacing. In yet another embodiment, a source feature module in a request chain is constrained from transmitting downstream an alternative source address more concrete than its own address. And in an additional embodiment, a target feature module in a target region of a request chain is constrained from transmitting upstream an alternative target address that is more concrete than its own address. By applying one or more of these constraints, the feature interaction problem associated with the providing of a multitude of features in a communication system may be reduced or substantially eliminated.

These and other advantages of the invention will be apparent to those of ordinary skill in the art by reference to the following detailed description and the accompanying drawings.

DETAILED DESCRIPTION

In telecommunication networks, addresses are used to route message traffic between nodes in a network. A particular address may be associated with a device, such as a telephone, with a set of features, or both. As used herein, a device typically functions as an interface to an end user, while a set of features involves interfacing a call with, for example, a computer program to provide features to that call. Telecommunication services and features are typically provided in response to requests for those services and features. As discussed above, such requests typically carry at least two addresses: a source address in a source address field indicating which device or feature is making a request and a target address in a target address field indicating the destination of the request. Since the requesting address is not typically directly connected to the destination address, such requests occur across the telecommunication network in a chain from an address associated with one device or feature set to an address associated with another device or feature set. Routing of such telecommunication requests across a telecommunication network, using illustrative network routers, is well known.

Figure 1:
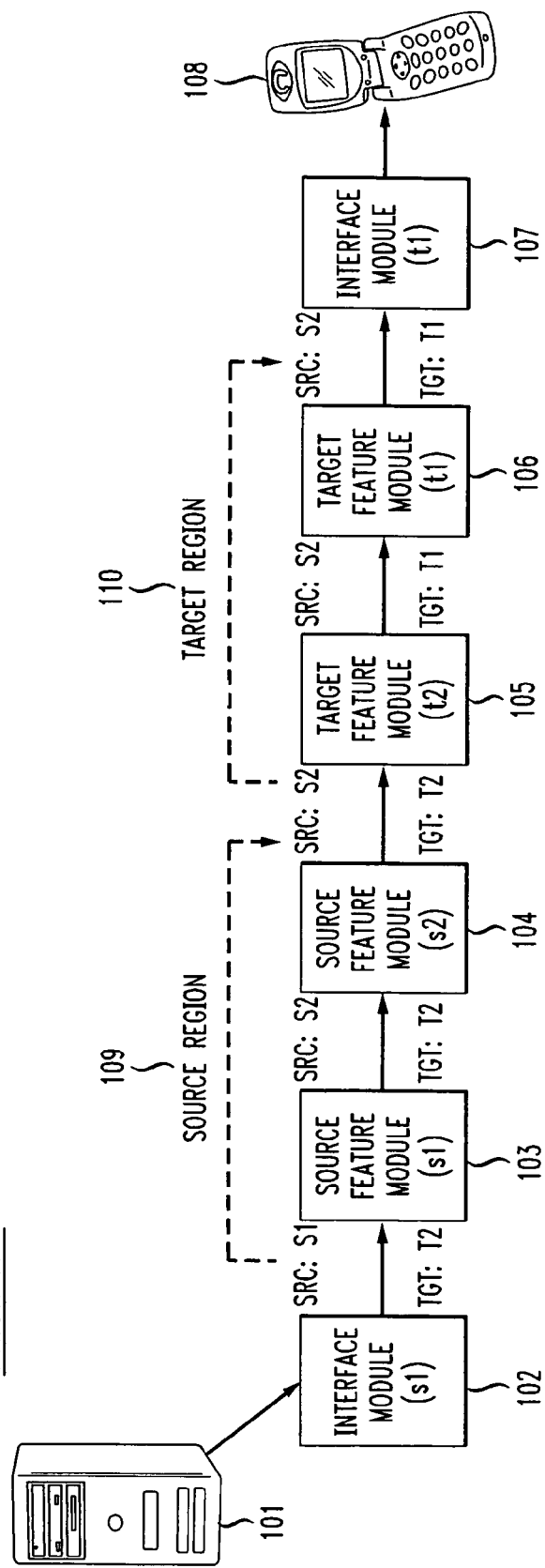
FIG. 1 shows a prior communication request chain.

FIG. 1 shows an illustrative request chain wherein, for example, computer 101 initiates a request for communications with cellular telephone 108. Specifically, FIG. 1 shows that the chain of communications between computer 101 and cellular telephone 108 may involve communications between a plurality of source modules in a source region 109 and a plurality of target modules in a target region 110.

As used herein, a module is defined as either an interface module, which is an interface between a telecommunication network and a device, or a feature module, which allows network traffic to access a telecommunication system feature. Interface modules are the modules through which devices send and receive telecommunications messages to/from the network, respectively, in order to facilitate the use of those devices. As is well-known, it is common for the address of a particular device to have only one interface module to which all requests for communication services are routed and from which all requests for communication are transmitted. Feature modules, on the other hand, are modules through which specific features are accessed in the network. Such features may include the well-known three-way calling feature, caller ID feature, call waiting feature, or any one of the multitude of other well-known features that may be provided in a telecommunication network.

For the purposes of the description herein, interface and feature modules may be implemented using programmable computers which are well known in the art. These programmable computers may be implemented as standalone devices or, as may be the case with interface module 102 and interface module 107, may be incorporated in other devices, such as within computer 101 or cellular telephone 108, respectively. Similarly, the illustrative programmable computers that host feature modules, such as feature modules 103-106, may each be hosted on one physical computing device or, alternatively, several features may be implemented on a single such computing device. Regardless of the precise hardware architecture, such programmable computers would have the required network interfaces to allow for receiving and transmitting network messages, as well as appropriate software for defining the functioning of the modules. Such software is executed on one or more computer processors which control the overall operation of the modules via execution of such software. The detailed hardware and software configuration of the modules will not be described in further detail herein. One skilled in the art of data networking and computers could readily implement such modules given the description herein.

Referring once again to FIG. 1, a request for communication services with cellular telephone 108 is sent in FIG. 1 from computer 101 to interface module 102 and then to source feature module 103 having address s1, which is an illustrative source feature module in source region 109 that contains those features applicable to a request chain whose source is address s1. The request is then sent, for example, to another source feature module 104 having an address s2 for the application of one or more other source features. The request is then routed to the target region using well-known routing techniques where it is received by target feature module 105 having address t2. The request is then forwarded to target feature module 106 having address t1 in target region 110 before being passed to the corresponding interface module 107 corresponding to cellular telephone 108 in order to complete the request chain. As is well-understood, the signaling channels between the interface modules and feature modules are illustratively created by the request protocol and requests transmitted among the modules are routed along these channels.

One skilled in the art will recognize that the request chain of FIG. 1 requires address translation in order to route the request to various different modules. For example, in order to transmit the call from source feature module 104 to target feature module 105, the target address must be changed from s2, which was the target address used by source feature module 103 to transmit the request to module 104, to t2, which is the address of target feature module 105.

Figure 2:
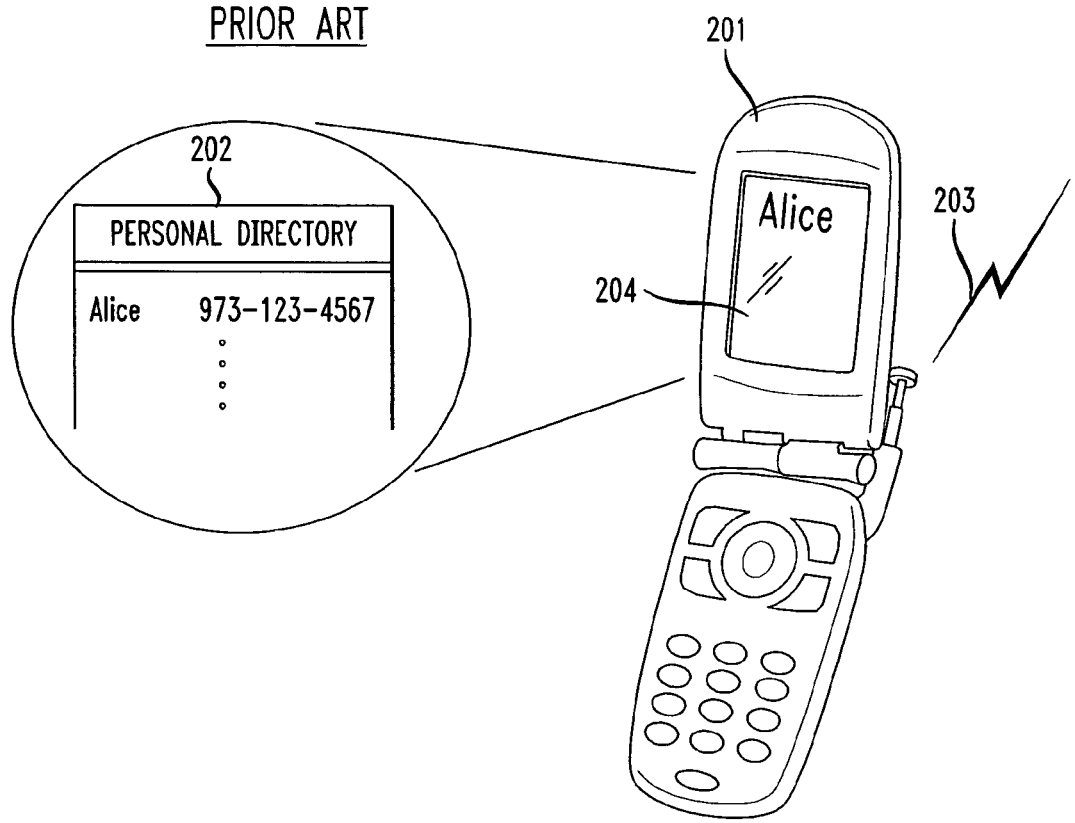
FIG. 2 shows how a prior personal directory feature may interact with a caller ID feature on a telephone.

As discussed above, problems may arise when a multitude of features are available in a telecommunication system in that those features may interact together to produce unintended results. As used herein, the term feature interaction is defined as the way in which a feature or features modify or influence another feature in defining overall system behavior. Since all features in telecommunication systems are modifying or enhancing the same basic communication service (i.e., real-time communication among people), such feature interaction occurs frequently. In some cases, feature interactions are benign or even may be considered advantageous in that they produce desirable results. One illustrative example of such a desirable feature interaction, illustrated in FIG. 2, may be found in the interaction between caller ID and some personal directory features. Specifically, if a first user has a personal directory that maps nicknames of contacts to telephone numbers, then when one of the contacts calls the first user, the nickname may appear on the caller ID display as opposed to the contact's full name. Referring to FIG. 2, a cellular telephone 201 may contain a personal directory feature that allows a user to input names and telephone numbers corresponding to those names. Such a personal directory may take the form of personal directory table 202, which shows nicknames associated with such phone numbers, for example the name "Alice" corresponding to the phone number 973-123-4567. One skilled in the art will recognize that such a personal directory may be actually stored in memory on the cellular telephone or, alternatively, may be stored on a network element of the cellular service provider. In either case, when a request for communication arrives at cellular telephone 201, for example as signal 203, the cellular telephone cross references the personal directory by looking up the phone number. If a match is found in the personal directory, the telephone may, for example, advantageously only provide a caller ID display of the nickname "Alice" on display 104. Thus, the interaction of the caller ID feature and the personal directory feature in the example of FIG. 2 may be considered desirable.

Figure 3:
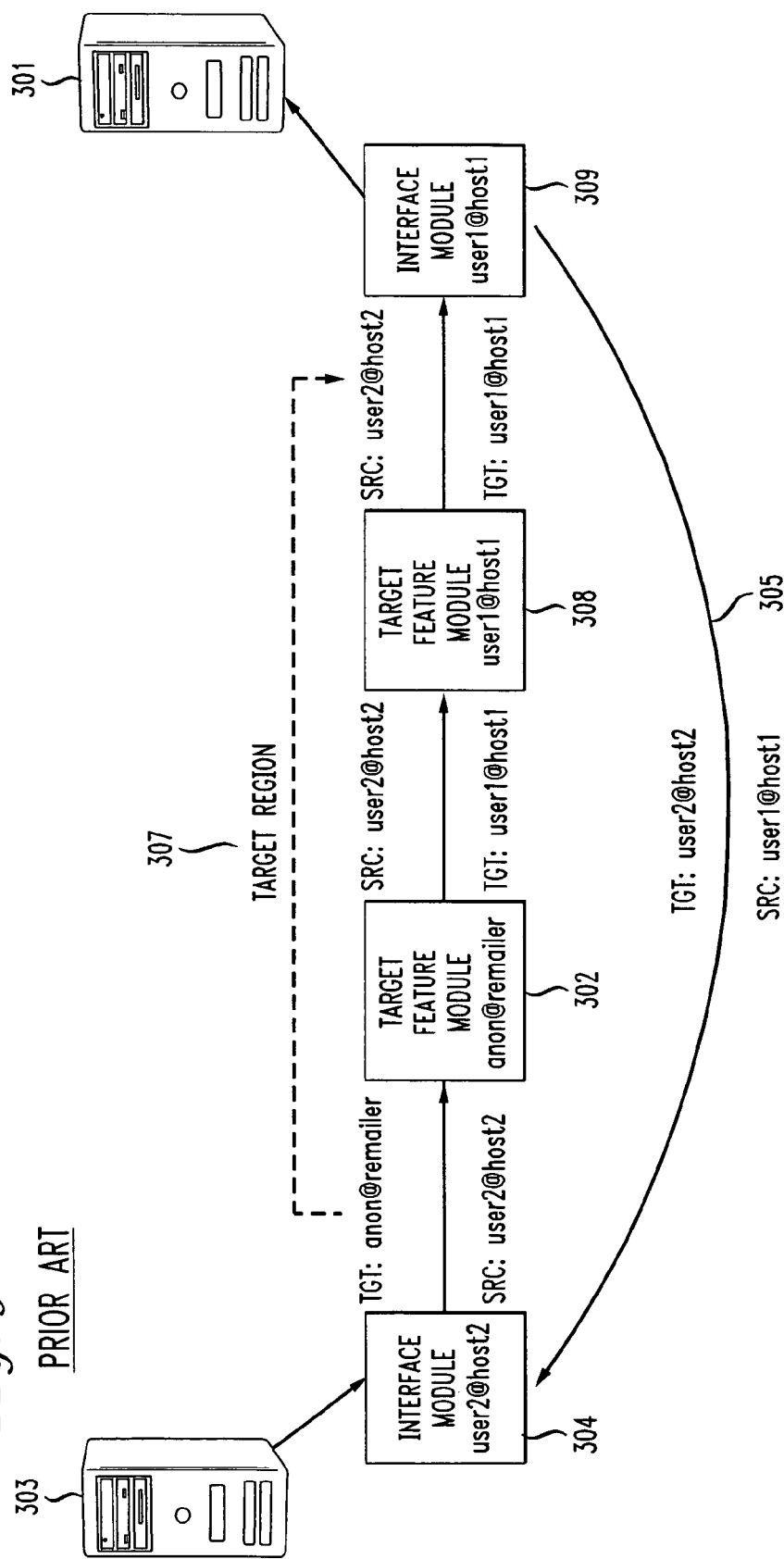
FIG. 3 shows another prior communication request chain involving an anonymous remailer feature module.

While the above desirable interaction may be considered advantageous, in many other cases the results of feature interaction may be undesirable and, therefore, would be considered disadvantageous. FIG. 3 shows one example of such an undesirable interaction that can be found in the illustrative interaction between an anonymous remailing feature and an autoresponse feature. Specifically, referring to FIG. 3, a user 301 having an address of user1@host1 employs an anonymous remailing feature provided by target feature module 302 in the target region 307. If an email message 304, for example, is sent to the address anon@remailer of user 301 from a source address user2@host 2 of a caller 303, that message will first be routed to the remailing feature module 302. The remailing feature module 302 then reassigns the target address to user1@host1, maintains the source address as user2@host2, and forwards the message.

User 301 having address user1@host1 may subscribe to an anonymous remailing feature service provided, for example, by target feature module 308. This service illustratively provides an automatic response feature while, for example, user 301 is on vacation. In such a case, message 304 will be routed through module 308, and the automatic response feature may automatically respond to the message by sending a message 305 back to caller 303 having a target address of user2@host2 and a source address of user1@host1. Thus, the anonymity to the caller 303 of the user1@host1 address of user 301 is not preserved.

Figure 4:
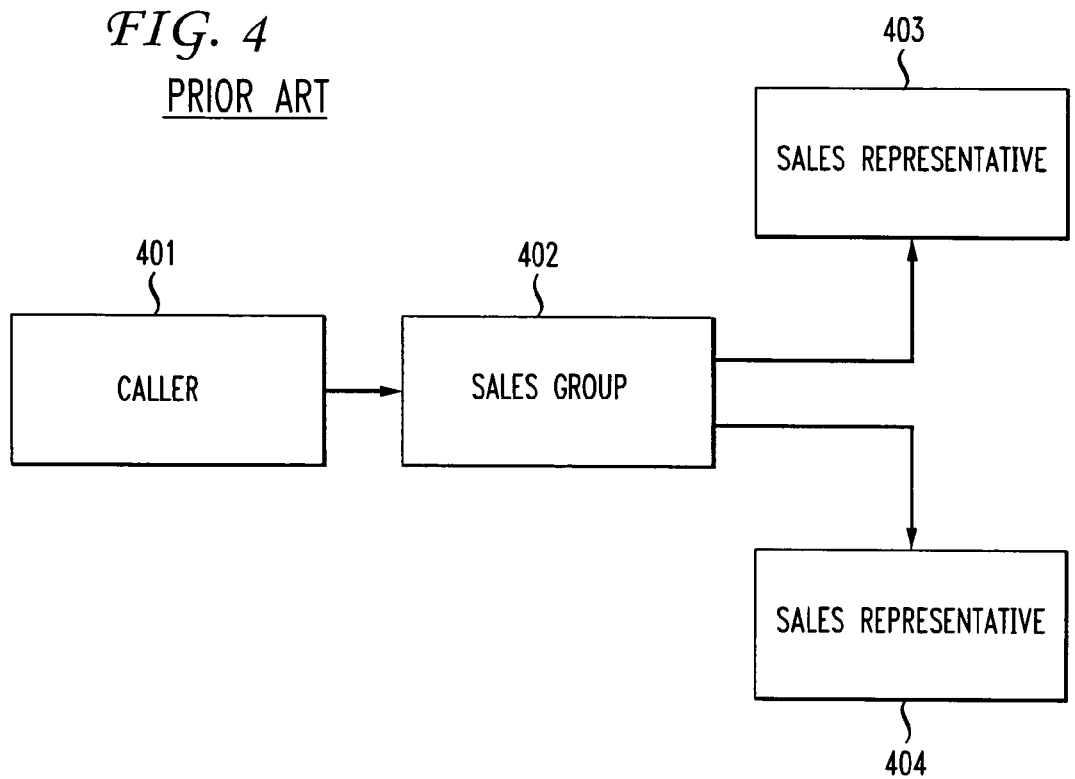
FIG. 4 shows a prior communication request chain involving a sales group and representative.

A second example of an undesirable feature interaction is shown in FIG. 4. Specifically, FIG. 4 shows the illustrative situation where a caller 401 places a call to a sales group 402 and a feature for that group provided by a target feature module associated with sales group 402 automatically selects a particular representative 403 to receive the call from the caller 401. If representative 403 is unavailable, for example, a voice mail feature associated with representative 403 illustratively offers to take a message. However, this may be disadvantageous in that the caller 401 would usually prefer to speak to another representative of the sales group, such as representative 404, instead of leaving a message. The foregoing examples of undesirable feature interaction are merely illustrative. One skilled in the art will recognize that many such undesirable interactions may occur as the number of features in networks increase.

In the above examples of feature interactions, as well as many other examples of such interactions, undesirable results occur as a result of address translation and, more particularly, to a lack of appropriate categorization of addresses that prevents the appropriate prioritization of features requiring address translations. Thus, the principles of the present invention are directed to a method for address translation whereby addresses are categorized relative to other addresses and address translation functions are performed only pursuant to specific constraints related to the categorization of the addresses.

Figure 5:
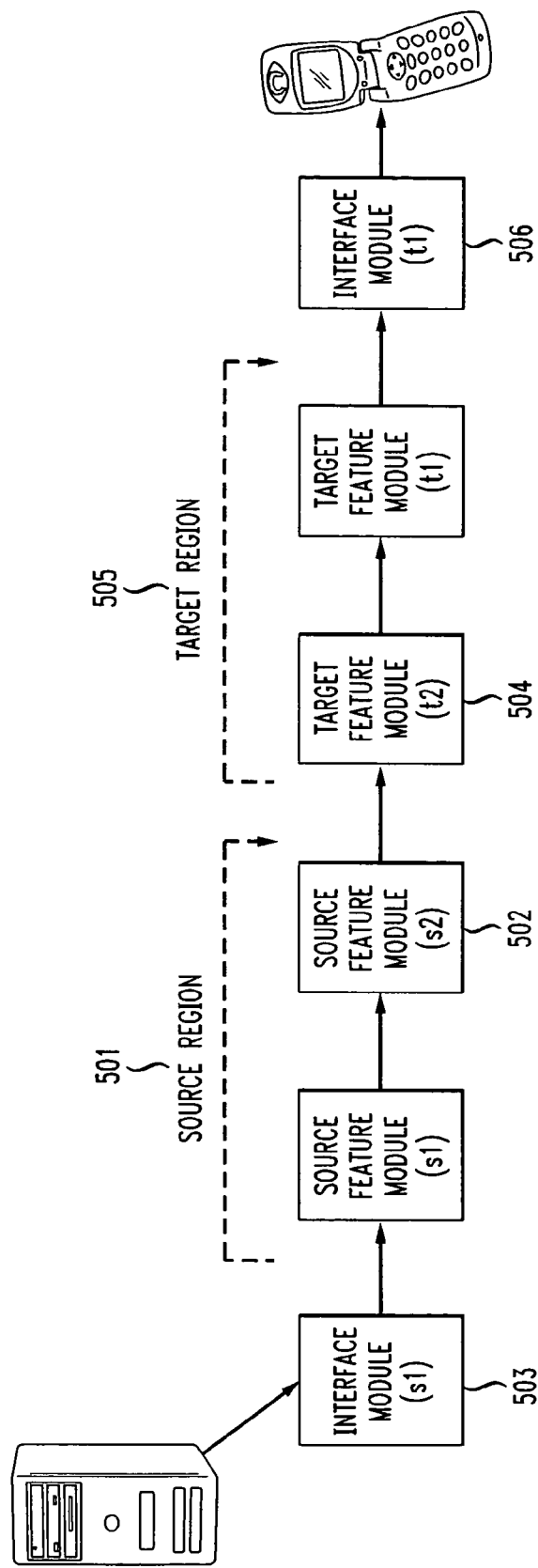
FIG. 5 shows an illustrative communication chain with abstract and concrete address associated with modules in the chain.

More specifically, as discussed above, requests for services typically consist of a chain of requests between interface and feature modules. FIG. 5 shows a network in which a message flow in accordance with the principles of the present invention may be implemented. Specifically, the addresses associated with interface and feature modules are categorized as to whether they are "abstract" or "concrete" with respect to other addresses. As used herein, addresses that more closely identify a source corresponding directly to, for example, an individual user are referred to as more concrete, while addresses that can be used to potentially identify many users or groups of users are more abstract. Thus, an address associated with a cellular or landline telephone of a sales representative is more concrete than an address of the sales representative, and the address associated with the sales representative is more concrete than an address associated with a group of sales representatives. Similarly, an address associated with an anonymous remailer feature module is more abstract than the telephone or other device of a particular subscriber to the remailer feature. In FIG. 5, therefore, addresses are more concrete proportionately to the particularity with which those addresses correspond to an individual user in the source or target region. Thus, for example, address s2 of source feature module 502 in the source region 501 is less concrete and more abstract than the address s1 of source interface module 503. Similarly, address t2 of target feature module 504 in the target region 505 is likewise more abstract and less concrete than address t1 of target interface module 506. Each address in a request chain in a telecommunication network (or other communication network) can be likewise categorized as either abstract or concrete relative to other addresses in the chain.

In accordance with an embodiment of the present invention, once addresses are categorized according to the relative abstract or concrete nature of those addresses, constraints are applied that govern the address translation functions required by various features. While many constraints may be applied to address translation, the present inventor has identified several constraints that are particularly advantageous in preventing undesirable interaction between features resulting from such translation.

Figure 6:
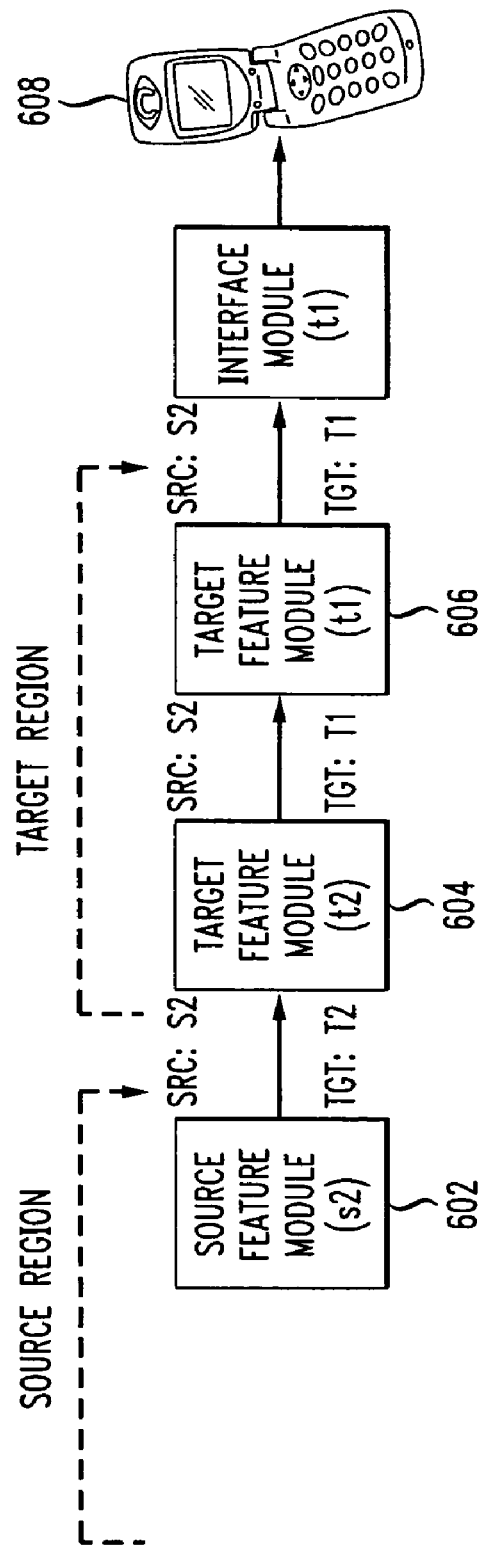
FIG. 6 shows an illustrative communication request chain illustrating one constraint to address translation in accordance with the principles of the present invention.

For example, in one embodiment of such a constraint shown in FIG. 6, hereinafter referred to as Constraint 1, a target feature module in a request chain, such as target feature module 604 having address t2 is not permitted to change the source address of a request. Therefore, for example, referring to FIG. 6, when target feature module 604 having address t2 receives a request from source feature module 602 having source address s2, target feature module 604 forwards the request to target feature module 606 having address t1 by translating the target address from address t2 to address t1. The target feature module 604 is constrained, however, to retain the source address s2 and not translate the source to address t2 corresponding to target feature module 604. Such a constraint functions to preserve the reversibility of a request. Reversibility, as used herein, is the ability to send a request or other message in the reverse direction from a target address back to a source address. More particularly, for example, if target feature module 604 replaced the source address s2 in a request chain, cellular telephone 608 would not have true source information available in order to send a reply back to the originator of the message. By imposing a constraint that prevents target modules from changing source address, reversibility of the request is preserved.

In another illustrative constraint in accordance with another embodiment of the present invention, the relative abstract and concrete categorizations of addresses in a request chain are used as a constraint to address translation. This constraint, hereinafter referred to in general as Constraint 2, is a function of whether the module at which address translation occurs is a target module in the target region or a source module in the source region. Specifically, in the embodiment of this constraint as applied to the source region (hereinafter referred to as Constraint 2s), if a source feature module in a request chain changes the source address of a request, the new source address must be more abstract than the old one. Similarly, in the embodiment of this constraint in the target region (hereinafter referred to as 2t), if a target feature module in a request chain changes the target address of a request, the new target address must be more concrete than the old one.

Adhering to constraints 2s and 2t will force an orderly progression of address translation from, in the source region, a more concrete address to a more abstract address and, in the target region, from a more abstract address to a more concrete address. Thus, address translations that would jump from one level of abstraction to a higher level of abstraction and, then, back to a lower level of abstraction are prevented. In practical use, preventing such jumps bounds the number of feature modules that can be accessed in a request chain. Specifically, the number of modules that can be accessed in the source and target regions will be equal to or less than the levels of address abstraction defined in those regions, respectively. Since many undesirable feature interactions can be traced to a requirement to process a large number of features at different levels of abstraction in an inconsistent order, imposing the above constraints on address translations based on abstraction levels functions to reduce the undesirable feature interactions.

The above address translation constraints address the problem of translation of addresses primarily in a source address field and/or a target address field of a message. However, as is well known, source and target addresses are also frequently transmitted in signaling information sent along signaling channels. As is frequently the case, these addresses may indicate an alternative source or target address of the chain. Therefore, when such alternative addresses are used, in another embodiment of the present invention, an additional constraint (hereinafter referred to as Constraint 3) is imposed upon the address translation of these addresses in order to prevent or at least limit the aforementioned feature-interaction problem resulting from address translation of such alternative addresses. Specifically, in accordance with this embodiment, a constraint is applied to the source region of a message (hereinafter referred to as Constraint 3s) wherein a source feature module in a request chain may not transmit downstream (e.g., to a target address) an alternative source address for the chain that is more concrete than its own address. As a corollary, a constraint in the target region (hereinafter referred to as Constraint 3t) is applied so that a target feature module in a request chain cannot transmit upstream (e.g., to a source address) any address more concrete than its own address. As one skilled in the art will recognize in light of the teachings herein, Constraints 3s and 3t will help to, for example, preserve the privacy of any address more concrete than a target or source feature module.

Figure 7A:
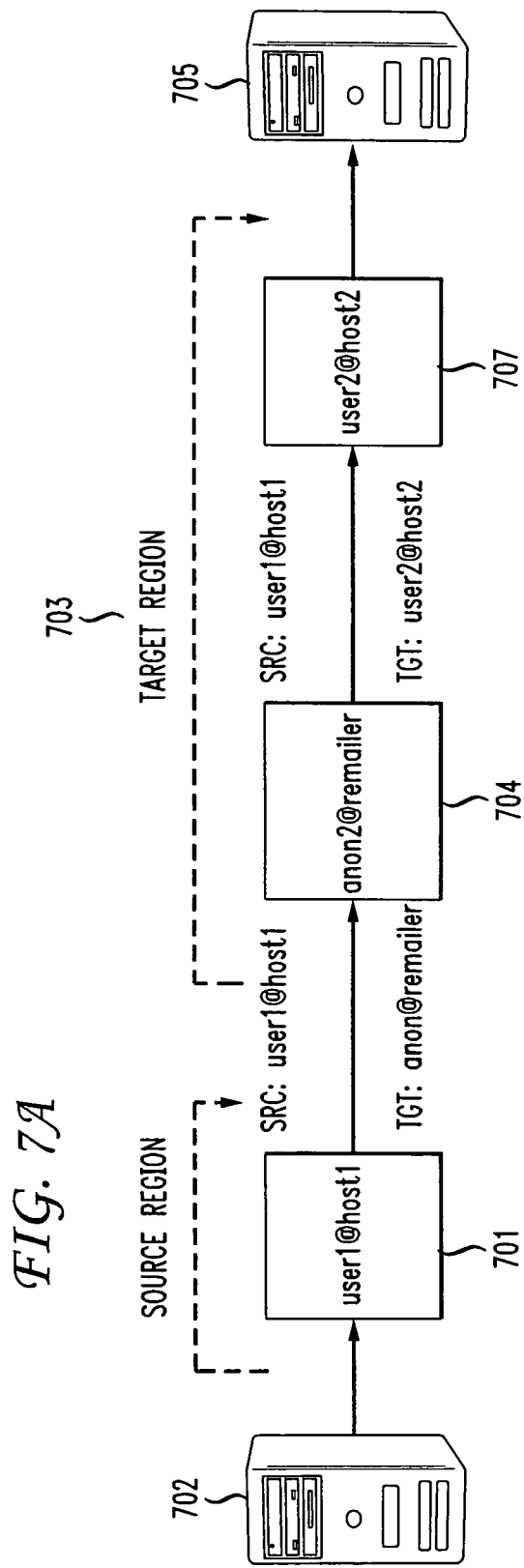
FIGS. 7A and 7B show another illustrative communication request chain illustrating another constraint to address translation in accordance with the principles of the present invention.
Figure 7B:
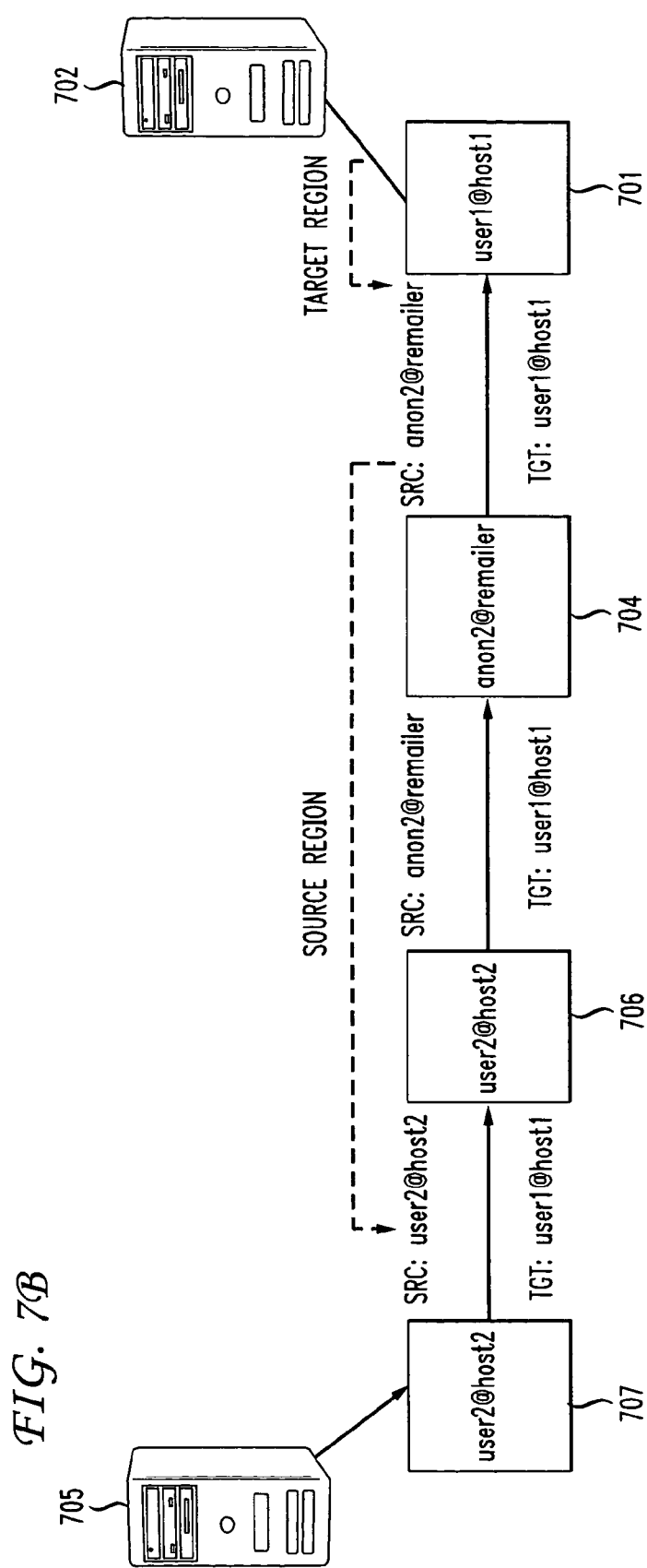

The foregoing constraints 1, 2s, 2t, 3s and 3t when applied to address translation will help to resolve many of the feature interaction problems described above. For example, referring once again to the example of a remailer feature, applying the above constraints may prevent the problem of inadvertent identification of a subscriber of such a feature. Specifically, FIGS. 7A and 7B illustrate how address translation could be performed using such constraints. Referring to FIG. 7A, as was described above in association with FIG. 3, illustrative source feature module 701, here a mail host for user1, sends an email message having a source address of user1@host1 and having a target address of an anonymous e-mail address here, illustratively, anon2@remailer. This message is routed to the target region 703 and is received by the target feature module 704 providing anonymous e-mail hosting services. As per Constraint 1, the target module 704 may not change the source address, thus preserving the identity of the original sender 702 as user1@host1. The target module 704 does, however, change the target address of the message from anon2@remailer to the address user2@host2 on mail host feature module 707 to forward the request to user 705. This translation conforms to Constraint 2t because the target address is translated to the more concrete user2@host2 address.

When the message is received at the email host 707 of user 705 with the address user2@host2, if an autoresponse feature is active for user 705 at, for example, user2@host2, then an automatic response to the email will be generated. A return message chain corresponding to this automatic response is shown in FIG. 7B. Referring to that figure, the automatic response will initially have a source address of user2@host2 and a target address of user1@host1 corresponding to user 702. However, as discussed above, it is undesirable to transmit a message directly from the address user2@host2 to user1@host1 because the privacy of the address user2@host2 would be lost. Therefore, the message is forwarded to a source feature module 706 that first checks whether it is desired to respond anonymously to the address user1@host1. One skilled in the art will recognize that this source feature module 706 may be implemented as a part of the mail host feature module 707 of user 705 or, alternatively, as a separate feature module. Once the source feature module 706 determines that user1@host1 should be responded to anonymously, the feature translates the source address user2@host2 to an address anon2@remailer and then forwards the message having this source address and the target address user1@host1 to the source remailer feature module 704 at anon2@remailer. This translation conforms to Constraint 2s which dictates that no source feature module may forward an address more concrete than its own address, since the address anon2@remailer is more abstract than the address user2@host2.

Once the source feature module 706 associated with user2@host2 translates the address to anon2@remailer2, the message is routed to the remailer feature module 704. Illustratively, the remailer feature module authenticates the use of the address anon2@remailer, for example by referring to an identifying key included in the message from user2@host2, and then forwards the message to address user1@host1 corresponding to user 701 without any additional address translation.

Figure 8A:
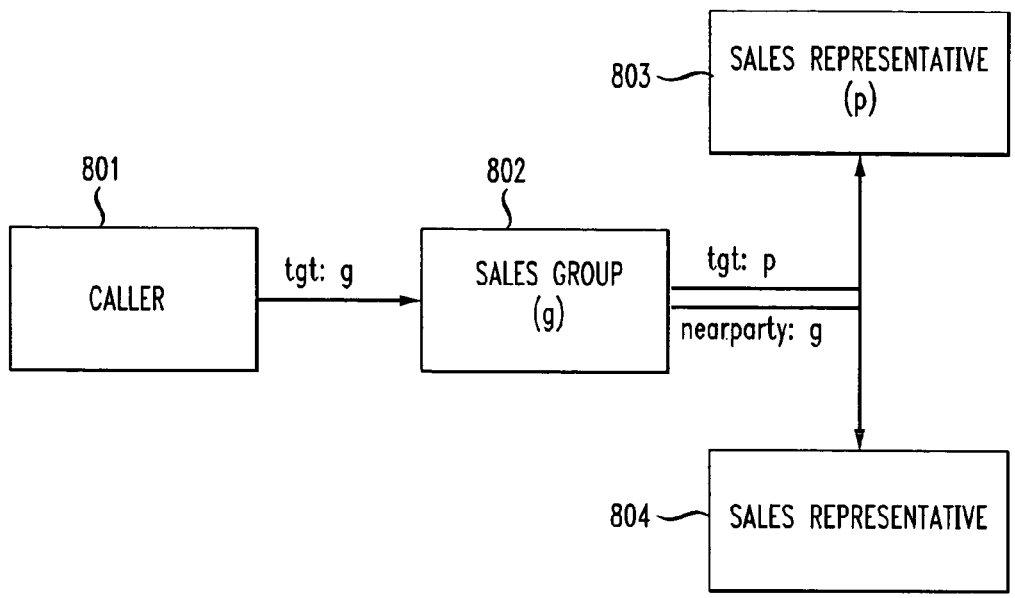
FIGS. 8A and 8B show yet another illustrative communication request chain illustrating a constraint to address translation in accordance with the principles of the present invention.
Figure 8B:
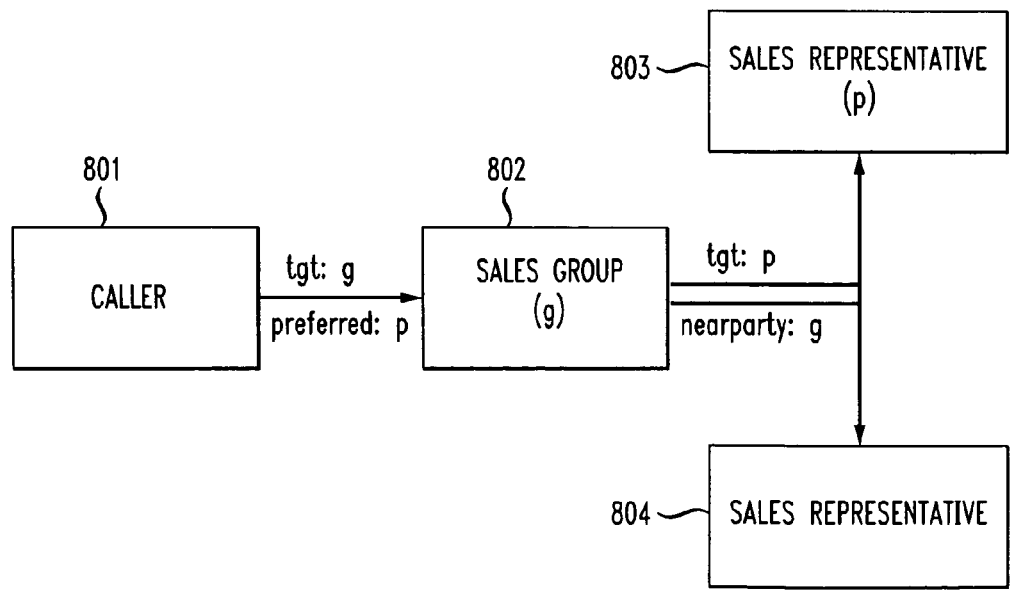

FIGS. 8A and 8B show another example of how constrained feature address translation in compliance with Constraints 3s and 3t may be implemented. Specifically, FIG. 8A once again presents the situation where a customer 801 calls a sales group, as discussed above in association with FIG. 4. However, in this example, the call has called a target address of g associated with the group feature module 802. The call is routed to the group feature module 802, which translates the target address g to a target address of p, associated with a particular sales representative 803, which is more concrete than the address g and therefore this translation does not violate Constraint 2t. However, in addition, group feature module 802 also sends downstream a signal with a parameter of "nearparty" having a value of address g of group feature module 802. This parameter is an alternative target address that indicates that any or certain features associated with the call should be performed by the group feature module 802 and not a module associated with the sales representative 803 at address p. As a result, instead of a module associated with sales representative 803 transferring the call to voice mail, the call will be returned to sales group feature module 802 for either rerouting to another sales representative, such as sales representative 804 or for sending to a group voice mail function. While an alternative target address is being transmitted in this scenario, this processing conforms to Constraint 3t since the alternative target address g is being sent downstream in the target region associated with the sales group, not upstream.

FIG. 8B shows a more complex example of FIG. 8A, also illustrating a possible call from a user to a sales group target. Referring to that figure, the caller 801 places a call having a target address g corresponding to a sales group feature module, and also provides signaling information with an alternative target address indicating that the caller's favorite sales representative is sales representative 803 at address p. The call is forwarded by the sales group feature module 802 to address p and representative 803. In addition, the near party parameter may be provided once again, as described above, in order to return the call to sales group feature module 802 in the event sales representative 803 is unavailable. The example of FIG. 8B is an example of conformance with Constraint 3s, since an alternative target is provided by the source region, not an alternative source.

The constraints described hereinabove each dictate how address translation is to occur in target and source regions. These constraints to address translation control the high number of feature interactions in today's telecommunication networks. The end result of the application of such constraints is the reduction or elimination of many of the feature-interaction problems that occur in telecommunication networks today and which may be traced directly to issues created as a result of uncontrolled address translation.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method of processing a request for communication in a distributed feature composition network between a source region and a target region, comprising:
   receiving the request at a source feature module in the source region, the request comprising a first source address and a target address, the target address identifying a target module in the target region;
   adding at the source feature module a replacement source address to the request; and
   preventing any module in the target region from changing any source address in the request in order to reduce feature-interaction problems that occur as a result of address translation activities,
   wherein the replacement source address is required to be more abstract than the first source address.

2. The method of claim 1 wherein the replacement source address identifies a specific individual source feature module in the source region.

3. The method of claim 1 wherein the source feature module is required not to transmit downstream as the replacement source address any address more concrete than the address of the source feature module.

4. The method of claim 1 which further comprises allowing the source feature module to change the target address in the request to a different target address.

5. The method of claim 1 which further comprises:
   routing the request to the target region.

6. The method of claim 1 which further comprises:
   routing the request with a proposed destination target address to a target module in the target region; and
   adding a replacement target address to the request,
   wherein the replacement target address is required to be more concrete than the proposed destination target address.

7. A method of processing a request for communication in a distributed feature composition network between a source region and a target region, comprising:
   receiving the request at a source feature module in the source region, the request comprising a first source address and a target address, the target address identifying a target module in the target region;
   adding at the source feature module a replacement source address to the request; and
   preventing any module in the target region from changing any source address in the request in order to reduce feature-interaction problems that occur as a result of address translation activities,
   wherein the replacement source address is required to less particularly identify an individual user associated with the first source address than the first source address.

8. The method of claim 7 wherein the replacement source address identifies a specific individual source feature module in the source region.

9. The method of claim 7 wherein the source feature module is required not to transmit downstream as the replacement source address any address that more particularly identifies an individual user associated with the first source address than the address of the source feature module.

10. The method of claim 7 which further comprises allowing the source feature module to change the target address in the communication to a different target address.

11. The method of claim 7 which further comprises:
   routing the request to the target region.

12. The method of claim 7 which further comprises:
   routing the request with a proposed destination target address to a target module in the target region; and
   adding a replacement target address to the request,
   wherein the replacement target address is required to more particularly identify an individual user associated with the proposed destination target address than the proposed destination target address.

13. A system for providing telecommunication features in a distributed feature composition network comprising:
   a source feature module configured to receive a request comprising a first source address and a target address, the target address identifying a target module located in a target region, the source feature module further configured to add a replacement source address, wherein the replacement source address is required to be more abstract than the first source address; and
   a target feature module located in the target region configured to receive the request comprising the replacement source address and the target address, wherein the target feature module is prevented from changing any source address in the request in order to reduce feature-interaction problems that occur as a result of address translation activities.

14. The system of claim 13 wherein the replacement source address identifies a specific individual source feature module in the source region.

15. The system of claim 13 wherein the source feature module is configured to not transmit downstream as the replacement source address any address more concrete than the address of the source feature module.

16. The system of claim 13 wherein the source feature module is configured to change the target address in the request to a different target address.

17. The system of claim 13 wherein the source feature module is configured to route the request to the target region.

* * * * *